United States Patent
Xu et al.

(10) Patent No.: US 10,904,557 B2
(45) Date of Patent: Jan. 26, 2021

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/393,779

(22) Filed: Apr. 24, 2019

(65) Prior Publication Data

US 2020/0236384 A1 Jul. 23, 2020

Related U.S. Application Data

(60) Provisional application No. 62/795,368, filed on Jan. 22, 2019.

(51) Int. Cl.
| | |
|---|---|
| *H04N 19/107* | (2014.01) |
| *H04N 19/513* | (2014.01) |
| *H04N 19/176* | (2014.01) |
| *H04N 19/44* | (2014.01) |

(52) U.S. Cl.
CPC ......... *H04N 19/513* (2014.11); *H04N 19/107* (2014.11); *H04N 19/176* (2014.11); *H04N 19/44* (2014.11)

(58) Field of Classification Search
CPC .... H04N 19/513; H04N 19/44; H04N 19/107; H04N 19/176
See application file for complete search history.

(56) References Cited

U.S. PATENT DOCUMENTS

| | | | |
|---|---|---|---|
| 2016/0105670 A1* | 4/2016 | Pang | H04N 19/176 375/240.16 |
| 2020/0112738 A1* | 4/2020 | Lee | H04N 19/136 |

OTHER PUBLICATIONS

X. Xu, S. Liu, T. Chuang, Y. Huang, S. Lei, K. Rapaka, C. Pang, V. Seregin, Y. Wang, and M. Karczewicz, "Intra Block Copy in HEVC Screen Content Coding Extensions," IEEE J. Emerg. Sel. Topics Circuits Syst., vol. 6, No. 4, pp. 409-419, 2016.
S. Liu, X. Xu, S. Lei and K. Jou, "Overview of HEVC extensions on screen content coding", APSIPA Transactions on Signal and Information Processing, SIP (2015), vol. 4, e10, p. 1 of 12.

(Continued)

*Primary Examiner* — Joseph W Becker
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. In some embodiments, the processing circuitry decodes first prediction information of a first block from a coded video bitstream. The first block is within a merge sharing node (MSN) with an intra block copy (IBC) merge candidate list that is constructed based on the MSN and shared within the MSN. The first prediction information is indicative of an IBC mode. Then, the processing circuitry determines a first block vector that points to a first reference area in a same picture as the first block based on the IBC merge candidate list associated with the MSN, and reconstructs at least a sample of the first block based on first reference samples of the first reference area in the same picture.

20 Claims, 17 Drawing Sheets

(56) References Cited

OTHER PUBLICATIONS

R. Joshi, S. Liu, G. Sullivan, YK Wang, J. Xu, Y. Ye, "HEVC Screen Content Coding Draft Text 6", JCTVC-W1005, Proceeding of 23rd JCT-VC meeting, San Diego, CA, USA, Feb. 2016.
B. Bross, J. Chen, S. Liu, Versatile Video Coding (Draft 3), JVET-L1001-v7, Macao, Dec. 2018.
Xiaohzong Xu, Xiang Li and Shan Liu, "CE8: CPR mode with local search ranges (Test CE8.3.1 and CE8.3.2)", JVET-L0293, Macao, Dec. 2018.
Xiaozhong Xu, Xiang Li and Shan Liu, "CE8-related: CPR mode with local search range optimization", JVET-L0297, Macao, Dec. 2018.

* cited by examiner

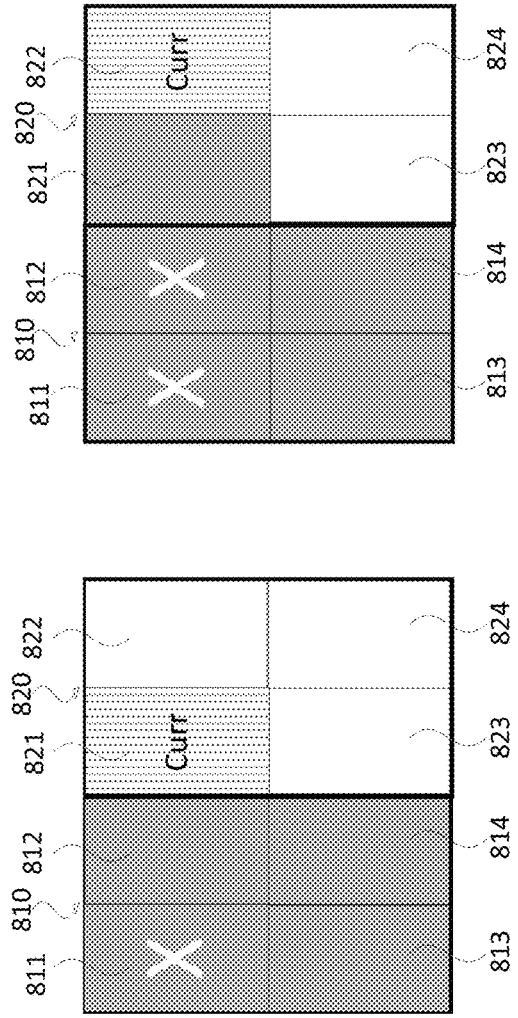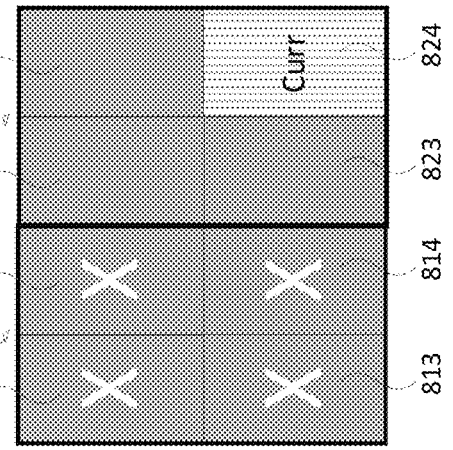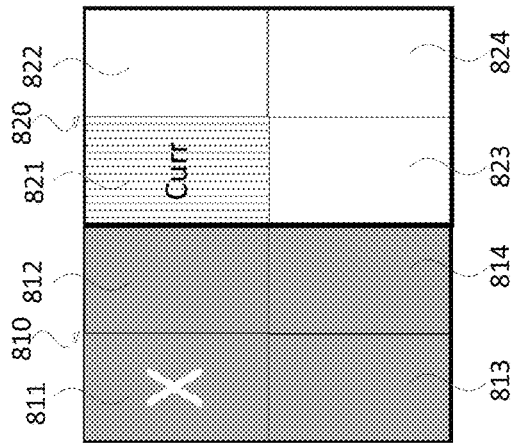

METHOD AND APPARATUS FOR VIDEO CODING

INCORPORATION BY REFERENCE

This present disclosure claims the benefit of priority to U.S. Provisional Application No. 62/795,368, "BLOCK VECTOR PREDICTION WITH PARALLEL PROCESSING CONSIDERATIONS" filed on Jan. 22, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

SUMMARY

Aspects of the disclosure provide methods and apparatuses for video encoding/decoding. In some examples, an apparatus for video decoding includes receiving circuitry and processing circuitry. In some embodiments, the processing circuitry decodes first prediction information of a first block from a coded video bitstream. The first block is within a merge sharing node (MSN) with an intra block copy (IBC) merge candidate list that is constructed based on the MSN and shared within the MSN. The first prediction information is indicative of an IBC mode. Then, the processing circuitry determines a first block vector that points to a first reference area in a same picture as the first block based on the IBC merge candidate list associated with the MSN, and reconstructs at least a sample of the first block based on first reference samples of the first reference area in the same picture.

In an embodiment, the processing circuitry decodes second prediction information of a second block from the coded video bitstream. The second block is also within the MSN, and the second prediction information is indicative of the intra block copy mode. The processing circuitry determines a second block vector that points to a second reference area in the same picture based on the IBC merge candidate list that is shared by the first block and the second block, and reconstructs at least a sample of the second block based on second reference samples of the second reference area in the same picture.

In another embodiment, the processing circuitry decodes second prediction information of a second block from the coded video bitstream. The second block is within the MSN with an inter prediction merge candidate list that is separate from the IBC merge candidate list and is constructed based on the MSN. The second prediction information is indicative of an inter prediction mode. The processing circuitry determines a motion vector that points to a reference area in a reference picture based on the inter prediction merge candidate list, and reconstructs at least a sample of the second block based on reference samples of the reference area in the reference picture.

According to an aspect of the disclosure, the processing circuitry selects an ancestor node of the first block in a coding tree to be the MSN node when the ancestor node meets a size requirement and constructs the IBC merge candidate list for the MSN based on spatial and temporal neighbors of the MSN. The IBC merge candidate list is used for reconstruction of blocks in the MSN and coded in the IBC mode.

In an embodiment, the processing circuitry maintains a history-based block vector prediction (HBVP) buffer associated with the MSN. The HBVP buffer is used for reconstruction of the blocks in the MSN and coded in the IBC mode. In an example, the processing circuitry skips an update of the HBVP buffer based on the first block vector. In another example, the processing circuitry updates the HBVP buffer based on the first block vector when a difference of the first block vector to a candidate is coded in the coded video bitstream. In another example, the processing circuitry updates the HBVP buffer based on the first block vector when the first block vector is not selected from the IBC merge candidate list. In another example, the processing circuitry updates the HBVP buffer based on the first block vector when the first block is at least one of the last coded block in the MSN and the last IBC coded block in the MSN.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 8A-8D show examples of effective search ranges for the intra block copy mode according to an embodiment of the disclosure.

DETAILED DESCRIPTION OF EMBODIMENTS

Figure 1:
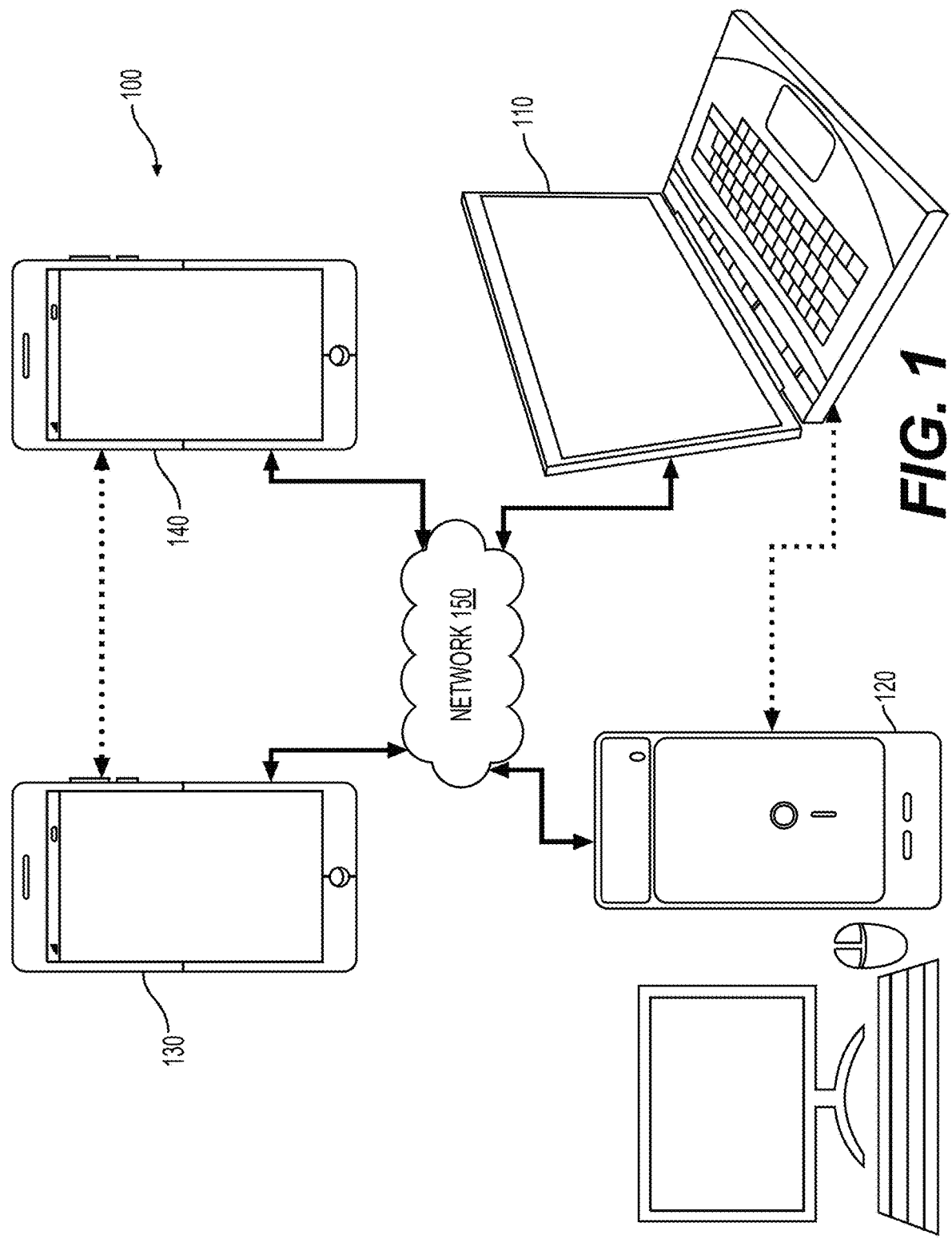
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
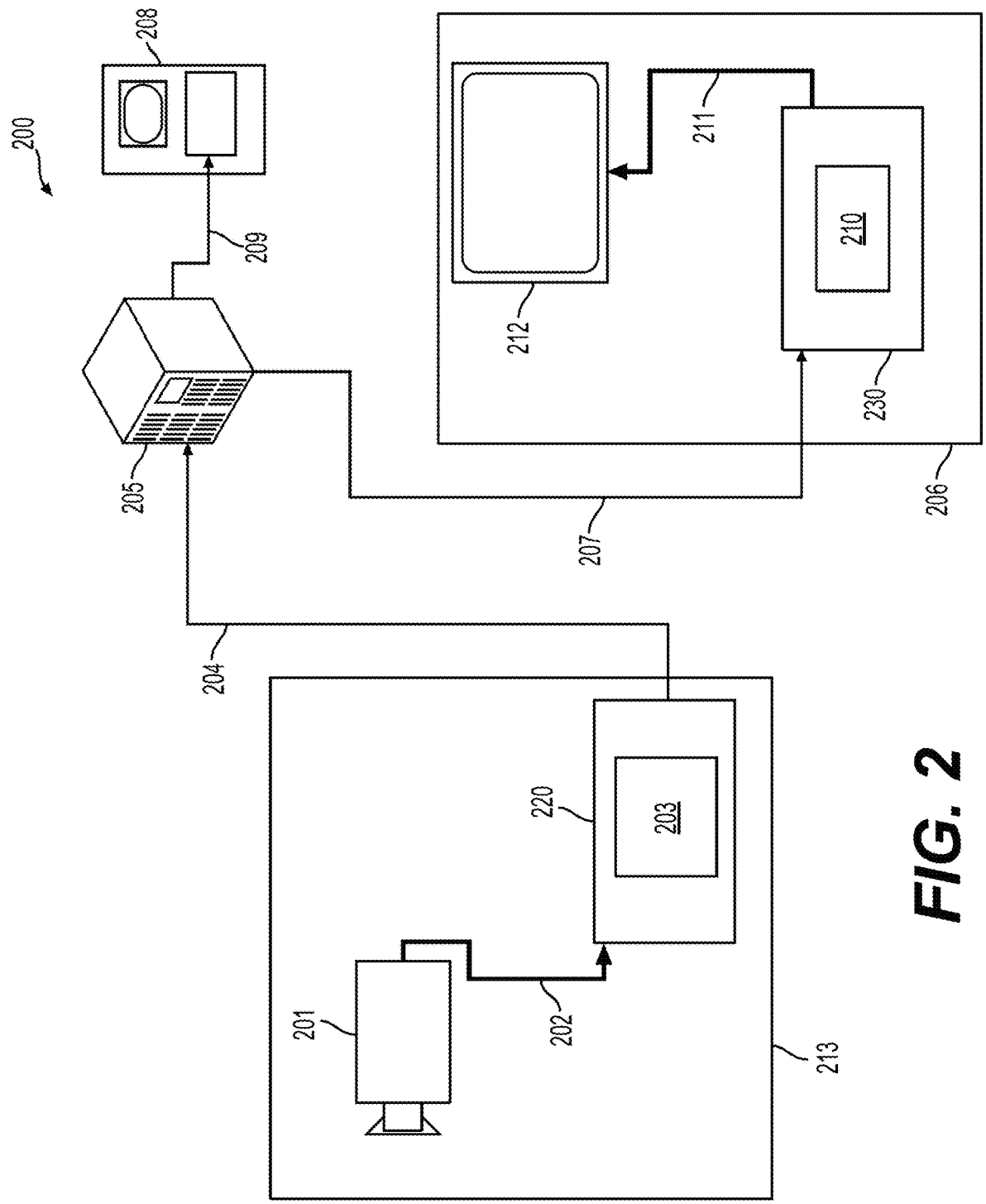
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
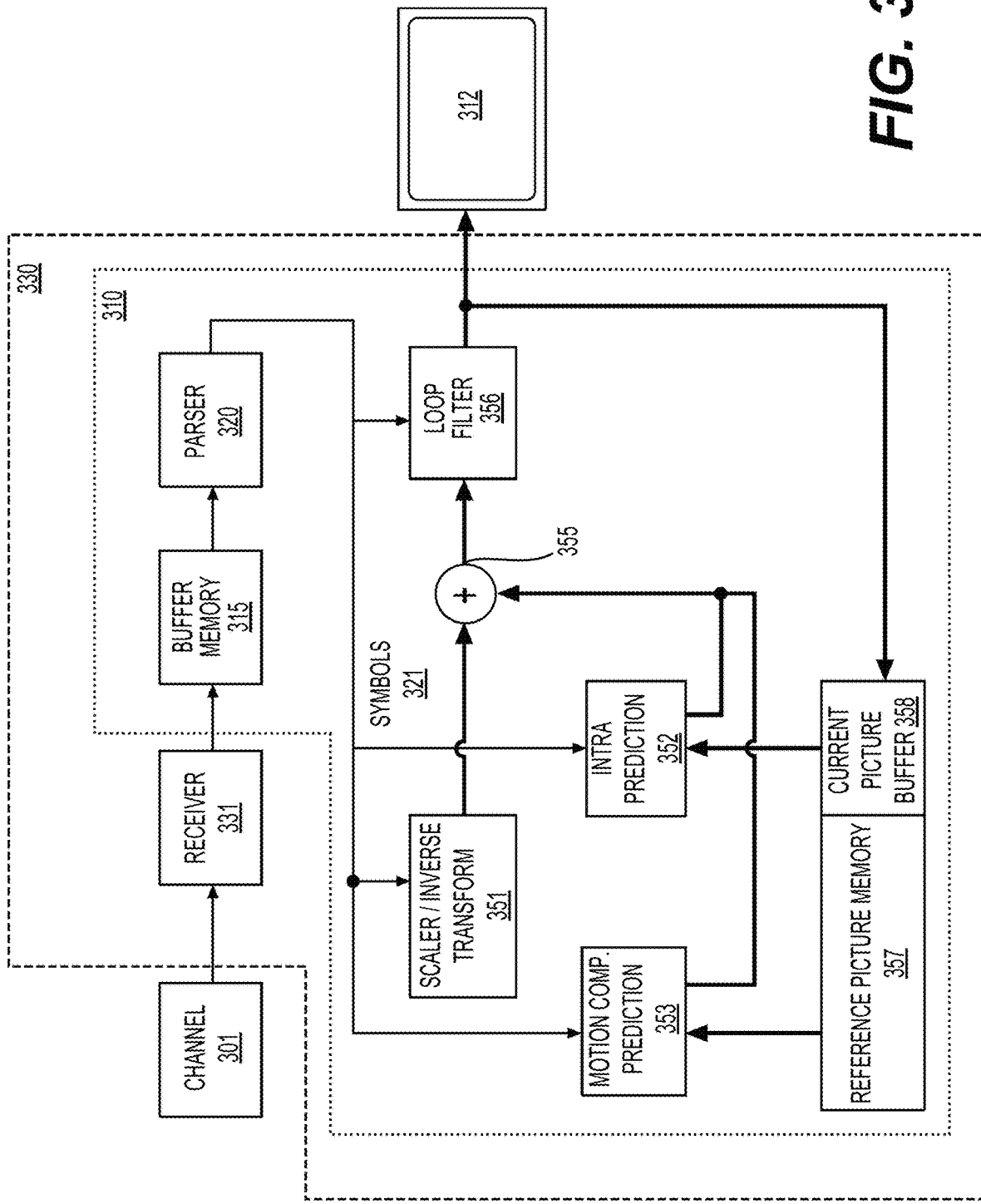
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
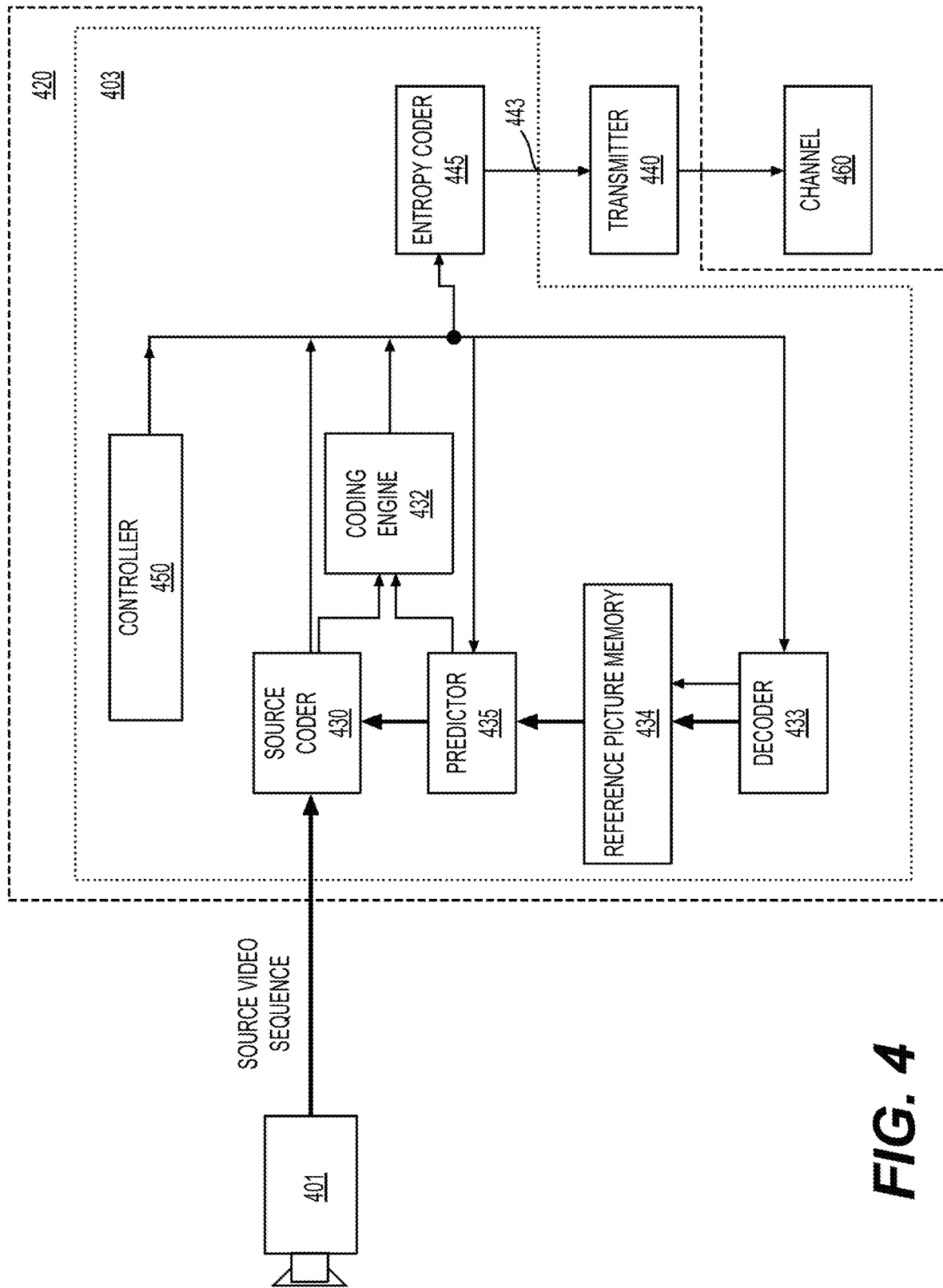
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
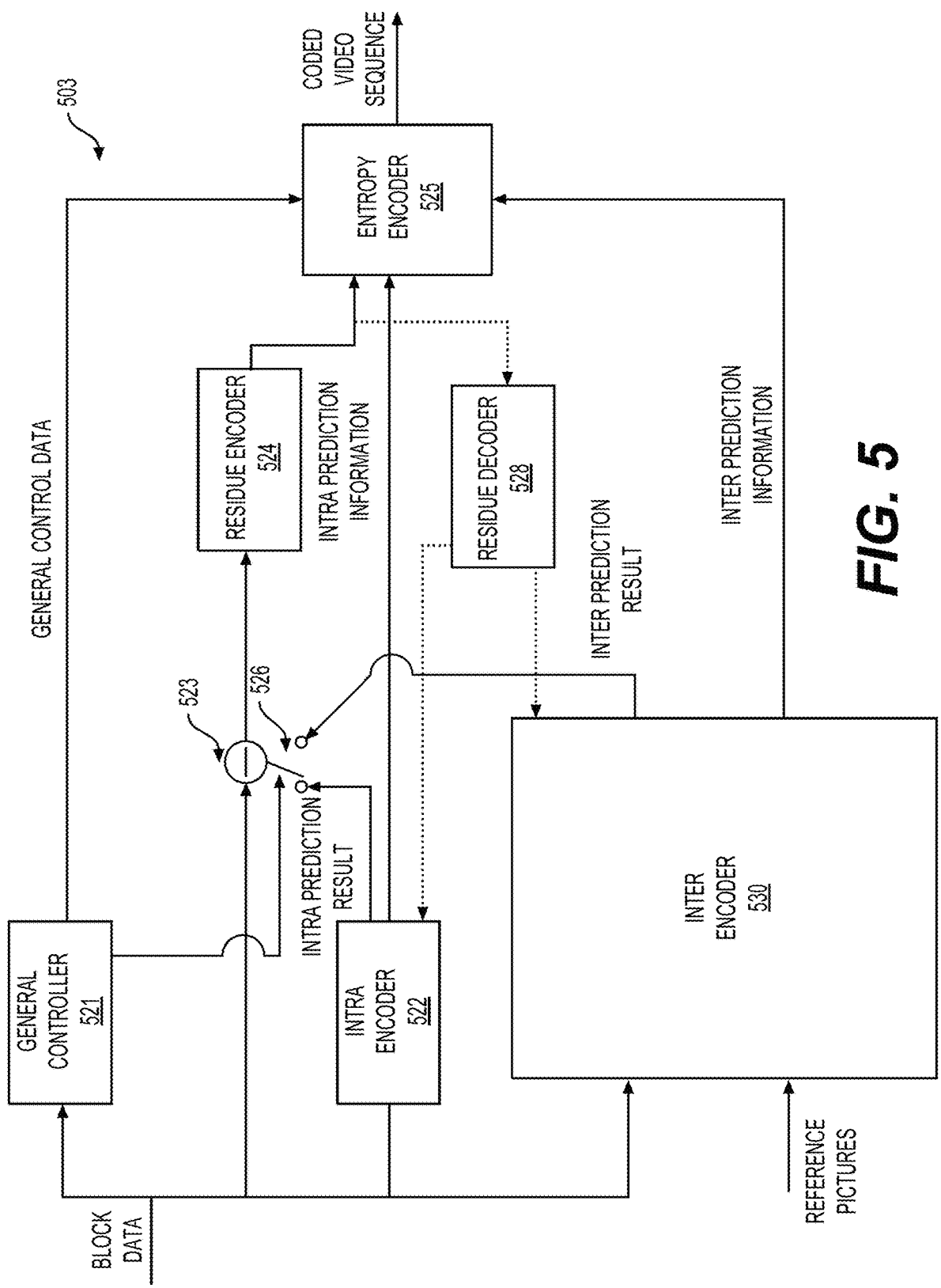
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
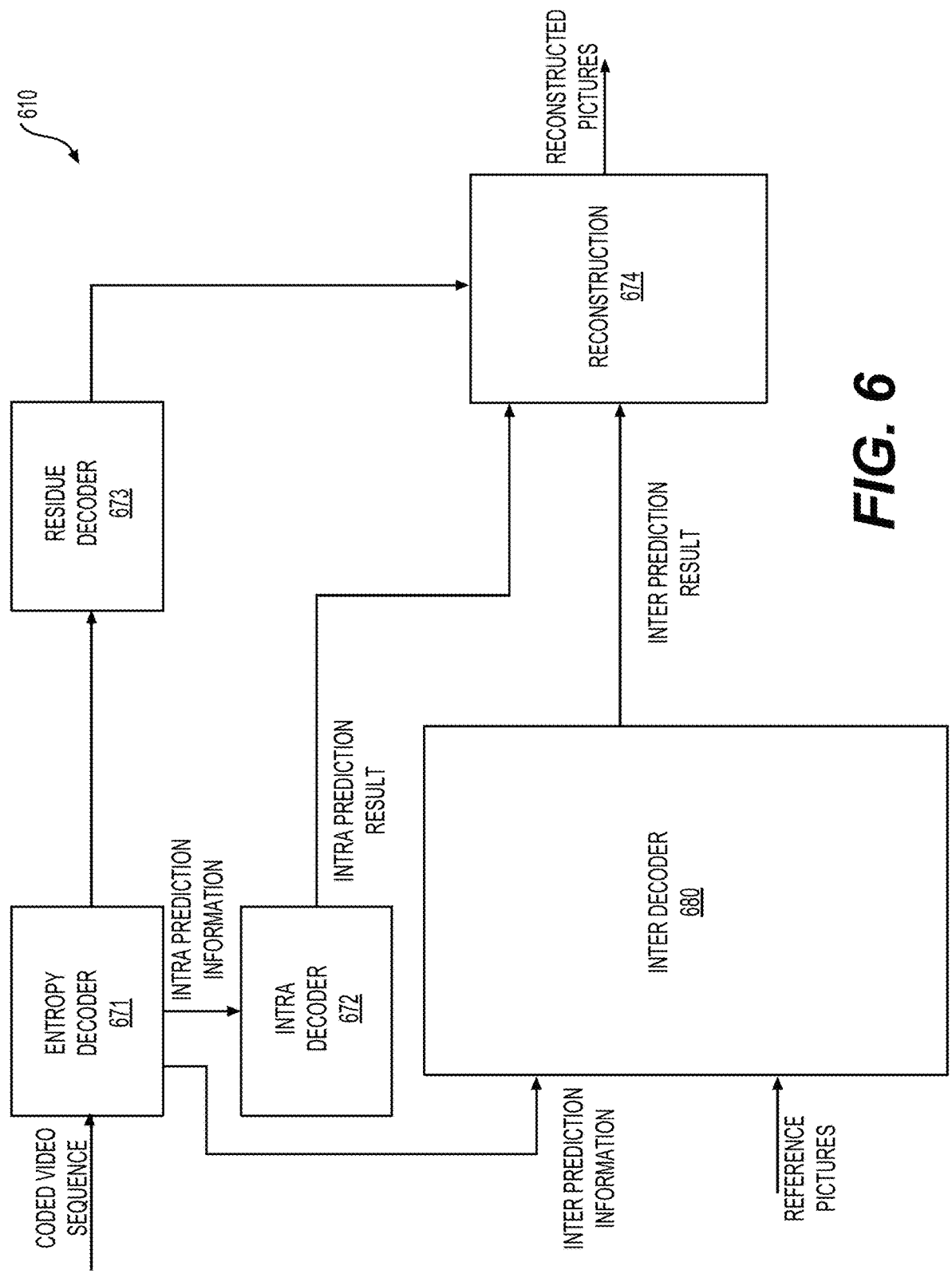
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques for block vector prediction in intra block copy mode with parallel processing considerations, such as techniques for sharing merge candidate list for intra block copy mode, and updating history-based block vector predictors when shared merge candidate list is used.

Block based compensation can be used for inter prediction and intra prediction. For the inter prediction, block based compensation from a different picture is known as motion compensation. For intra prediction, block based compensation can also be done from a previously reconstructed area within the same picture. The block based compensation from reconstructed area within the same picture is referred to as intra picture block compensation, current picture referencing (CPR) or intra block copy (IBC). A displacement vector that indicates the offset between the current block and the reference block in the same picture is referred to as a block vector (or BV for short). Different from a motion vector in motion compensation, which can be at any value (positive or negative, at either x or y direction), a block vector has a few constraints to ensure that the reference block is available and already reconstructed. Also, in some examples, for parallel processing consideration, some reference area that is tile boundary or wavefront ladder shape boundary is excluded.

The coding of a block vector could be either explicit or implicit. In the explicit mode (or referred to as advanced motion vector prediction (AMVP) mode in inter coding), the difference between a block vector and its predictor is signaled; in the implicit mode, the block vector is recovered from a predictor (referred to as block vector predictor), in a similar way as a motion vector in merge mode. The resolution of a block vector, in some implementations, is restricted to integer positions; in other systems, the block vector is allowed to point to fractional positions.

In some examples, the use of intra block copy at block level, can be signaled using a reference index approach. The current picture under decoding is then treated as a reference picture. In an example, such a reference picture is put in the last position of a list of reference pictures. This special reference picture is also managed together with other temporal reference pictures in a buffer, such as decoded picture buffer (DPB).

There are also some variations for intra block copy, such as flipped intra block copy (the reference block is flipped horizontally or vertically before used to predict current block), or line based intra block copy (each compensation unit inside an MxN coding block is an Mx1 or 1xN line).

Figure 7:
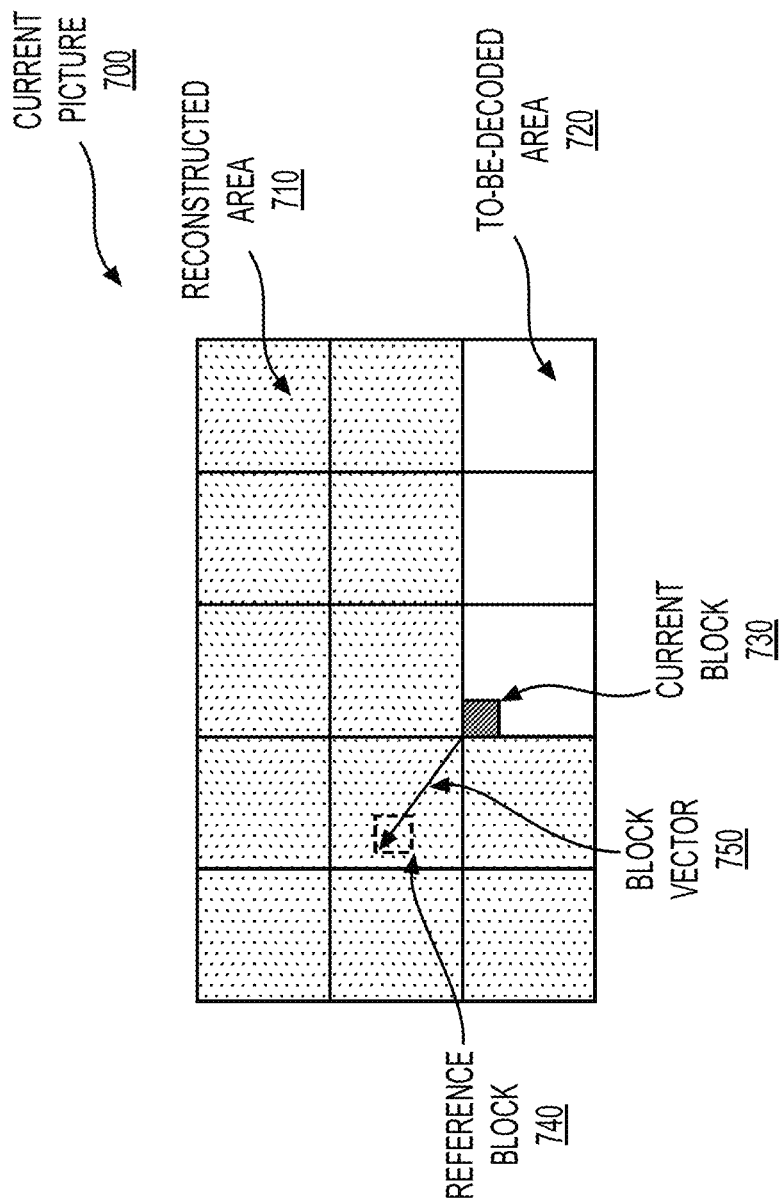
FIG. 7 shows an example of intra block copy according to an embodiment of the disclosure.

FIG. 7 shows an example of intra block copy according to an embodiment of the disclosure. Current picture (700) is under decoding. The current picture (700) includes a reconstructed area (710) (doted area) and to-be-decoded area (720) (white area). A current block (730) is under reconstruction by a decoder. The current block 730 can be reconstructed from a reference block 740 that is in the reconstructed area (710). The position offset between the reference block (740) and the current block (730) is referred to as a block vector (750) (or BV (750)).

In some examples (e.g., VVC), the search range of intra block copy mode is constrained to be within the current CTU. Then, the memory requirement to store reference samples for the intra block copy mode is 1 (largest) CTU size of samples. In an example, the (largest) CTU has a size of 128×128, and the current block has a size of 64×64. Thus, in some embodiments, the total memory (e.g., cache memory with fast access speed than a main storage) is able to store samples for a size of 128×128, and the total memory includes an existing reference sample memory portion to store reconstructed samples in the current block, such as a 64×64 region, and additional memory portion to store samples of three other regions of the size 64×64. Thus, in some examples, the effective search range of the intra block copy mode is extended to some part of the left CTU while the total memory requirement for storing reference pixels are kept unchanged (e.g., 1 CTU size, 4 times of the 64×64 reference sample memory in total).

FIGS. 8A-8D show examples of effective search ranges for the intra block copy mode according to an embodiment of the disclosure. In some examples, an encoder/decoder includes a cache memory that is able to store samples of one CTU, such as 128×128 samples. Further, in the FIGS. 8A-8D examples, a current block for prediction has a size of 64×64 samples. It is noted that the examples can be suitably modified for current block of other suitable sizes.

Each of FIGS. 8A-8D shows a current CTU (820) and a left CTU (810). The left CTU (810) includes four blocks (811)-(814), and each block has a sample size of 64×64 samples. The current CTU (820) includes four block (821)-(824), and each block has a sample size of 64×64 samples. The current CTU (820) is the CTU that includes a current block (as shown by a label "Curr" and with vertical stripe pattern) under reconstruction. The left CUT (810) is the immediate neighbor on the left side of the current CTU (820). It is noted in FIGS. 8A-8D, the grey blocks are blocks that are already reconstructed, and the white blocks are blocks that are to be reconstructed.

In FIG. 8A, the current block under reconstruction is the block (821). The cache memory stores reconstructed samples in the blocks (812), (813) and (814), and the cache memory will be used to store reconstructed samples of the current block (821). In the FIG. 8A example, the effective search range for the current block (821) includes the blocks (812), (813) and (814) in the left CTU (810) with reconstructed samples stored in the cache memory. It is noted that, in an embodiment, the reconstructed samples of the block (811) are stored in a main memory (e.g., are copied from the cache memory to the main memory before the reconstruction of the block (821)) that has a slower access speed than the cache memory.

In FIG. 8B, the current block under reconstruction is the block (822). The cache memory stores reconstructed samples in the blocks (813), (814) and (821), and the cache memory will be used to store reconstructed samples of the current block (822). In the FIG. 8B example, the effective search range for the current block (822) includes the blocks (813) and (814) in the left CTU (810) and (821) in the current CTU (820) with reconstructed samples stored in the cache memory. It is noted that, in an embodiment, the reconstructed samples of the block (812) are stored in a main memory (e.g., are copied from the cache memory to the main memory before the reconstruction of the block (822)) that has a slower access speed than the cache memory.

In FIG. 8C, the current block under reconstruction is the block (823). The cache memory stores reconstructed samples in the blocks (814), (821) and (822), and the cache memory will be used to store reconstructed samples of the current block (823). In the FIG. 8C example, the effective search range for the current block (823) includes the blocks (814) in the left CTU (810) and (821) and (822) in the current CTU (820) with reconstructed samples stored in the cache memory. It is noted that, in an embodiment, the reconstructed samples of the block (813) are stored in a main memory (e.g., are copied from the cache memory to the main memory before the reconstruction of the block (823)) that has a slower access speed than the cache memory.

In FIG. 8D, the current block under reconstruction is the block (824). The cache memory stores reconstructed samples in the blocks (821), (822) and (823), and the cache memory will be used to store reconstructed samples of the current block (824). In the FIG. 8D example, the effective search range for the current block (824) includes the blocks (821), (822) and (823) in the current CTU (820) with reconstructed samples stored in the cache memory. It is noted that, in an embodiment, the reconstructed samples of the block (814) are stored in a main memory (e.g., are copied from the cache memory to the main memory before the reconstruction of the block (824)) that has a slower access speed than the cache memory.

In the above examples, the cache memory has a total memory space for 1 (largest) CTU size. The examples can be suitably adjusted for other suitable CTU sizes.

Figure 9:
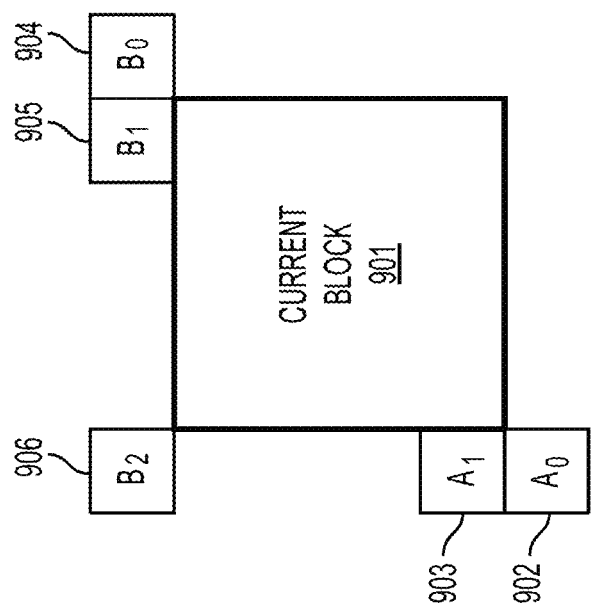
FIG. 9 is a schematic illustration of a current block and its surrounding spatial merge candidates in one example.

Referring to FIG. 9, a current block (901) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 ((902) through (906), respectively). In some examples, the MV prediction can use predictors from the same reference picture that the neighboring block is using.

In some embodiments, a merge mode for inter-picture prediction is used. In an example, when a merge flag (including skip flag) is signaled as true, a merge index is then signaled to indicate which candidate in a merge candidate list is used to indicate the motion vectors of the current block. At a decoder, a merge candidate list is constructed based on spatial and temporal neighbors of the current block. As shown in FIG. 9, neighboring MVs of A0, A1, and B0, B1, B2 can be added into the merge candidate list. In addition, an MV from temporal neighbors of the current block is added into the merge candidate list in an example. In an example, up to four spatial neighboring MVs are added into a merge candidate list, and up to one MV from temporal neighbors on the current block is added into the merge candidate list. It is noted that additional merge candidates, such as combined bi-predictive candidates and zero motion vector candidates, and the like can be added into the merge candidate list.

In some embodiments, before taking the motion information of a block as a merge candidate, a redundancy check is performed to check whether the motion information is identical to an existing element in the merge candidate list. If the motion information is different from any existing element in the merge candidate list, the motion information can be added into the merge candidate list as a merge candidate.

In some examples, a parameter MaxMergeCandsNum is defined as the maximum number of merge candidates in a merge candidate list. The parameter MaxMergeCandsNum is signaled in coded video bitstream in an example.

According to aspects of the disclosure, motion compensation based techniques can be suitably modified for the intra block copy.

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both the AMVP mode and the merge mode construct candidate list during decoding.

Figure 10:
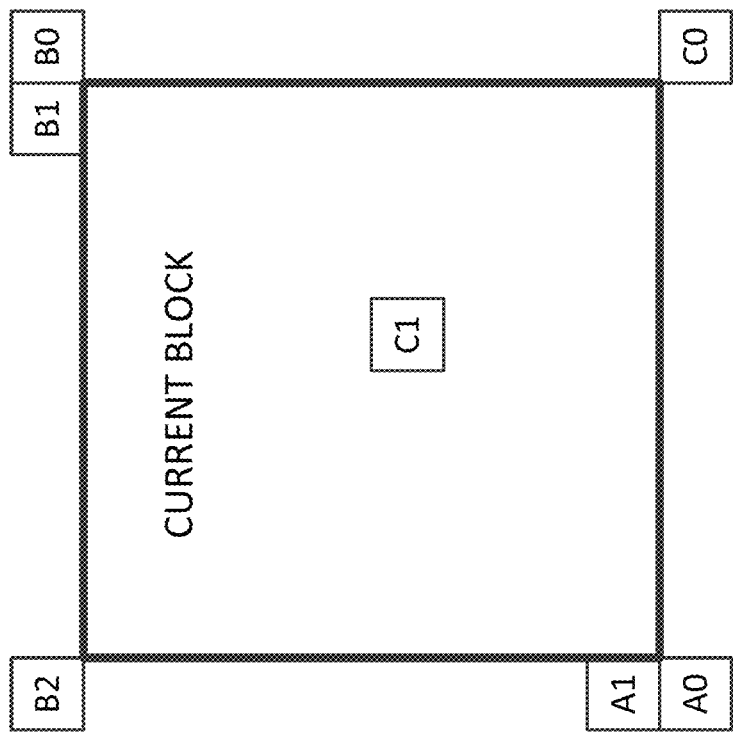
FIG. 10 shows an example of spatial and temporal candidates in some examples.

FIG. 10 shows an example of spatial and temporal candidates in some examples.

For the merge mode in the inter prediction, merge candidates in a candidate list are primarily formed by checking motion information from either spatial or temporal neighboring blocks of the current block. In the FIG. 10 example, candidate blocks A1, B1, B0, A0 and B2 are sequentially checked. When any of the candidate blocks are valid candidates, for example, are coded with motion vectors, then, the motion information of the valid candidate blocks can be added into the merge candidate list. Some pruning operation is performed to make sure duplicated candidates will not be put into the list again. The candidate blocks A1, B1, B0, A0 and B2 are adjacent to corners of the current block, and are referred to as corner candidates.

After spatial candidates, temporal candidates are also checked into the list. In some examples, the current block's co-located block in a specified reference picture is found. The motion information at C0 position (bottom right corner of the current block) of the co-located block will be used as temporal merge candidate. If the block at this position is not coded in inter mode or not available, C1 position (at the outer bottom right corner of the center of the co-located block) will be used instead.

The advanced motion vector prediction (AMVP) mode in HEVC refers to using spatial and temporal neighboring blocks' motion information to predict the motion information of the current block, while the prediction residue is further coded. Examples of spatial and temporal neighboring candidates are shown in FIG. 10 as well.

In some embodiments, in AMVP mode, a two-candidate motion vector predictor list is formed. For example, the list includes a first candidate predictor and a second candidate predictor. The first candidate predictor is from the first available motion vector from the left edge, in the order of spatial A0, A1 positions. The second candidate predictor is from the first available motion vector from the top edge, in the order of spatial B0, B1 and B2 positions. If no valid motion vector can be found from the checked locations for either the left edge or the top edge, no candidate will be filled in the list. If the two candidates available and are the same, only one will be kept in the list. If the list is not full (with two different candidates), the temporal co-located motion vector (after scaling) from C0 location will be used as another candidate. If motion information at C0 location is not available, location C1 will be used instead.

According to an aspect of the disclosure, a history-based MV prediction technique can be modified for the intra block copy mode.

According to the history-based MVP (HMVP) technique, a HMVP candidate is defined as the motion information of a previously coded block. In some embodiments, a table with multiple HMVP candidates is maintained during the encoding/decoding process. For example, the table is emptied at a beginning of a new slice. When there is an inter-coded non-affine block, either in merge/skip mode or AMVP mode with MVD, the associated motion information is added to the last entry of the table as a new HMVP candidate.

During operation in an example using the HMVP technique, a table with HMVP candidates is loaded before decoding a block. Then, the block is decoded with the HMVP candidates in the table. Further, the table is updated with decoded motion information of the block. The updated table can be loaded to decode subsequent blocks.

In some examples, a table size S is set to be a constant value, such as 6, which indicates that up to, for example 6 HMVP candidates, may be added into the table. In an embodiment, the table is implemented following a first-in-first-out (FIFO) rule. Further, at a time to insert a new motion candidate, referred to as a new HMVP candidate, into the table, a constrained FIFO rule is utilized. In some embodiments, the table is implemented using a buffer.

Figure 11:
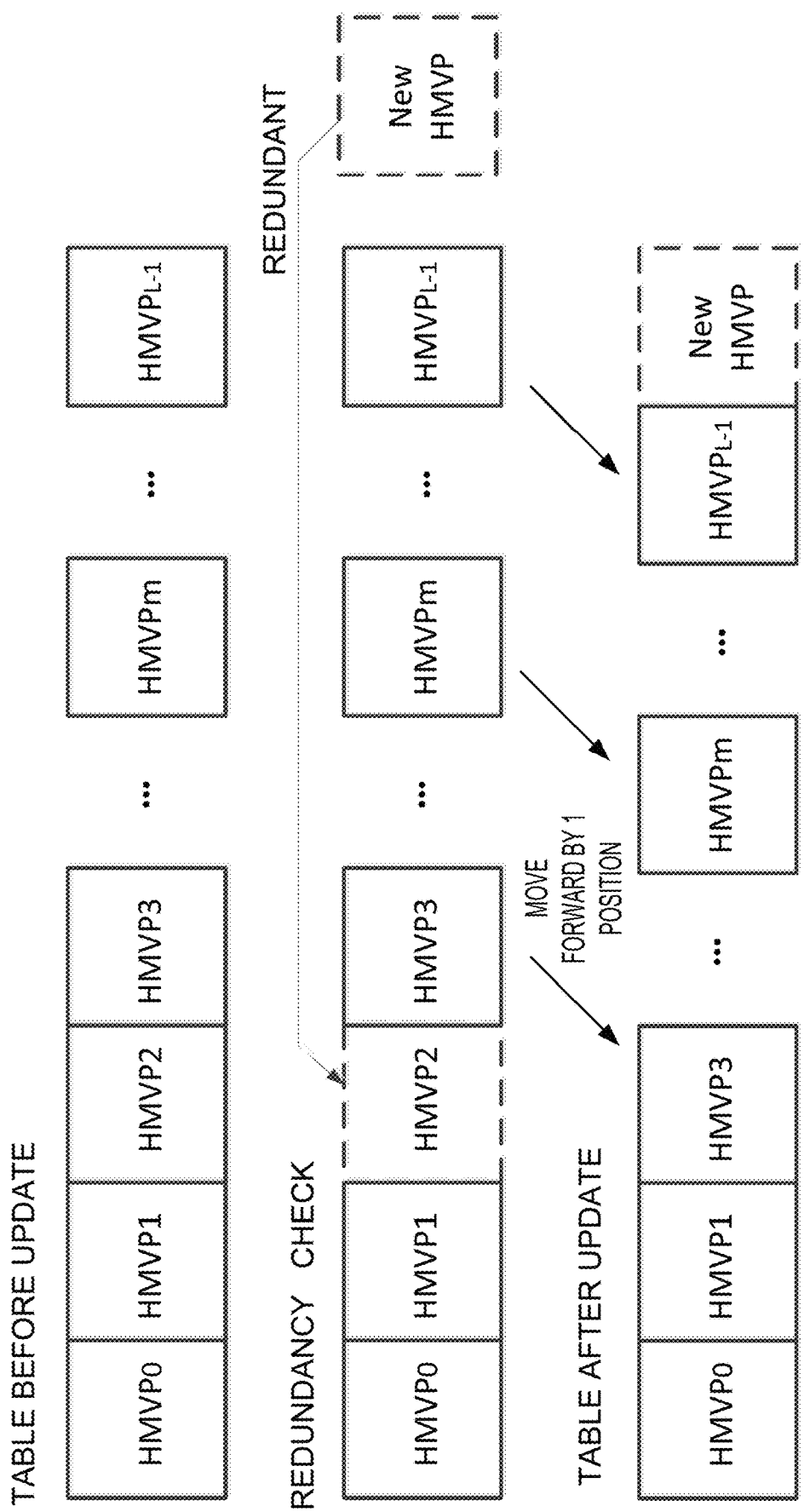
FIG. 11 shows an example of using the constrained FIFO rule to insert a new motion candidate.

FIG. 11 shows an example of using the constrained FIFO rule to insert a new motion candidate. According to the constrained FIFO rule, a redundancy check is applied to determine whether the table includes an identical HMVP candidate to the new HMVP candidate. When an identical HMVP candidate, such as $HMVP_2$ shown in FIG. 10, is found, the identical HMVP candidate is removed from the table and all the HMVP candidates afterwards are moved forward by 1 position, and the new HMVP candidate is added at the end (the latest position) of the table.

In some embodiments, HMVP candidates are used in the merge candidate list construction process. In an example, the latest several HMVP candidates in the table are checked in order (from the latest to older ones) and inserted to the candidate list after the temporal motion vector prediction (TMVP) candidate. It is noted that, in an example, a pruning operation is applied on the HMVP candidates with regard to the spatial or temporal merge candidate to exclude sub-block motion candidate (i.e., SbTMVP) of the spatial or temporal merge candidate.

In some examples, to reduce the number of pruning operations, three simplification techniques are used.

In a first simplification technique, the number of HMVP candidates to be checked is denoted by L, and L can be set as (Eq. 1):

$$L=(N<=4)?M:(8-N) \quad \text{(Eq. 1)}$$

where N denotes the number of available non-sub block merge candidates and M denotes the number of available HMVP candidates in the table.

In a second simplification technique, the maximum number MM of allowed merge candidates is signaled. Then, once the total number of available merge candidates reaches (MM−1), the merge candidate list construction process from HMVP list is terminated.

In a third simplification technique, the number of pairs for combined bi-predictive merge candidate derivation is reduced from 12 to 6.

In some embodiments, HMVP candidates are used in the AMVP candidate list construction process in a similar manner. In some examples, the motion vectors of the last K HMVP candidates in the table are inserted after the temporal motion vector prediction (TMVP) candidate. In some examples, only HMVP candidates with the same reference picture as the AMVP target reference picture are used to construct the AMVP candidate list. Pruning is applied on the HMVP candidates. In an AMVP candidate list construction example, K is set to 4 while the AMVP list size is kept unchanged, i.e., equal to 2.

In some embodiments, separate buffers are used for the history-based block vectors and history-based motion vectors. For example, the previously coded IBC block vectors may be stored in a separate buffer (referred as IBC HBVP buffer), different from the one used for storing previously coded MVs (referred as HMVP buffer). These stored BVs can be used to as BV predictors for the current block coded in IBC mode. The usage of HBVP buffer is similar as HMVP for inter coded blocks, such as, update process, pruning, and the placement of previous coded vectors in the merge/skip list or AMVP predictor list.

According to another aspect of the disclosure, a pairwise average technique is used in construction of a merge candidate list. In an example, merge candidates are generated by averaging predefined pairs of candidates in the current merge candidate list. For example, when the current merge candidate list has four candidates that are represented by indices 0, 1, 2 and 3, then six predefined pairs are defined as {(0, 1), (0, 2), (1, 2), (0, 3), (1, 3), (2, 3)}. In some examples, the pairwise average of motion vectors is calculated separately for each reference list. In an example, a reference list has two motion vectors, the two motion vectors are averaged to generate the pairwise average even when the two motion vectors point to different reference pictures. In another example, only one motion vector is available in a reference list, then the motion vector is used directly without pairwise average. In another example, when a reference list has no motion vector available, the reference list is kept invalid. The pairwise average candidates replace the combined candidates in some embodiments.

According to some aspects of the disclosure, merge with motion vector difference (MMVD) techniques can be used for either skip or merge modes with a motion vector expression method.

In some embodiments, MMVD re-uses merge candidates. For example, among the merge candidates, a candidate is selected, and is further expanded by a motion vector expression method. In some examples, a simplified signaling method is used to provide the motion vector expression that includes a starting point, and a motion offset including a motion magnitude, and a motion direction.

In some embodiments, MMVD technique uses a merge candidate list in VVC. In some examples, only candidates having default merge type (e.g., MRG_TYPE_DEFAULT_N) are considered for MMVD's expansion.

In some embodiments, a few syntax elements, such as a prediction direction IDX, a base candidate IDX, a distance IDX, a search direction IDX, and the like, are signaled to describe such an offset. For example, the prediction direction IDX is used to indicate which of the prediction directions (temporal prediction direction, e.g., L0 reference direction, L1 reference direction or L0 and L1 reference directions).

The base candidate IDX is used to indicate which of the existing merge candidates is used as the start point (based candidate) to apply the offset, such as the best candidate among candidates in a list, such as shown in Table 1. It is noted that, in an example, when the number of base candidates is equal to 1, the base candidate IDX is not signaled.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

The distance IDX is motion magnitude information and is used to indicate the pre-defined distance from the starting point information. Table 2 shows an example of the pre-defined distance:

TABLE 2

| Distance IDX | | | | | | | |
|---|---|---|---|---|---|---|---|
| Distance IDX | | | | | | | |
| 0 | 1 | 2 | 3 | 4 | 5 | 6 | 7 |
| Pixel distance ¼-pel | ½-pel | 1-pel | 2-pel | 4-pel | 8-pel | 16-pel | 32-pel |

The search direction IDX represents the direction of the MVD relative to the starting point. The search direction index can represent one of the four directions as shown in Table 3.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

In some embodiments, an MMVD flag is signaled right after sending a skip and merge flag. When the skip and merge flag is true, the MMVD flag is parsed. When the MMVD flag is equal to 1, in an example, MMVD syntaxes are parsed. When the MMVD flag is not 1, an AFFINE flag is parsed. When the AFFINE flag is equal to 1, the AFFINE mode is used for reconstruction. However, if the AFFINE flag is not 1, in an example, skip/merge index is parsed for VVC test model (VTM) skip/merge mode.

Figure 12:
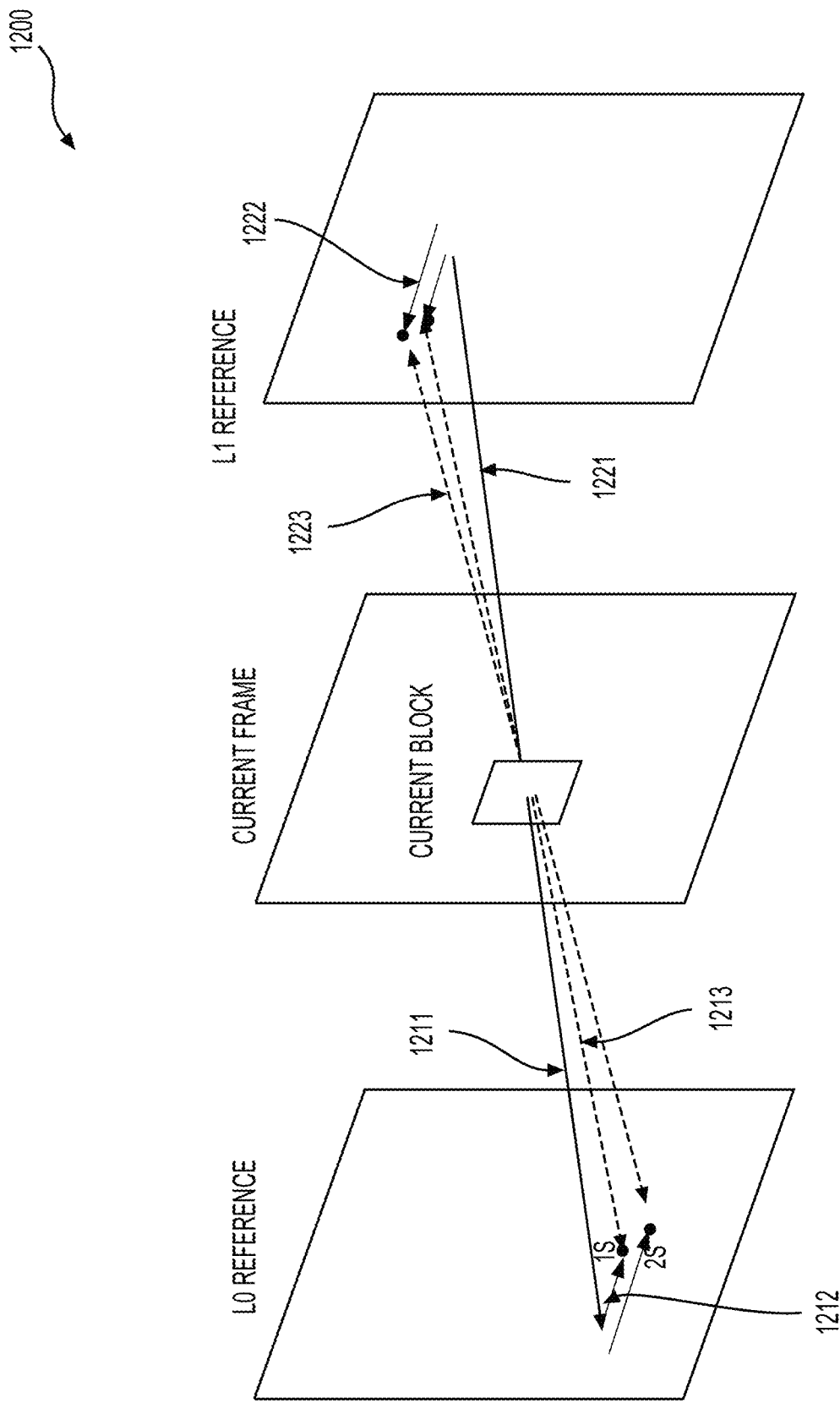
FIG. 12 shows examples for MMVD according to an embodiment of the disclosure.

FIG. 12 shows examples for MMVD according to an embodiment of the disclosure. In an example, the starting point MV is shown by (1211) (for example according to the prediction direction IDX and base candidate IDX), the offset is shown by (1212) (for example according to the distance IDX and the search direction IDX), and the final MV predictor is shown by (1213) in FIG. 12. In another example, the starting point MV is shown by (1221) (for example according to the prediction direction IDX and base candidate IDX), the offset is shown by (1222) (for example according to the distance IDX and the search direction IDX), and the final MV predictor is shown by (1223) in FIG. 12.

Figure 13:
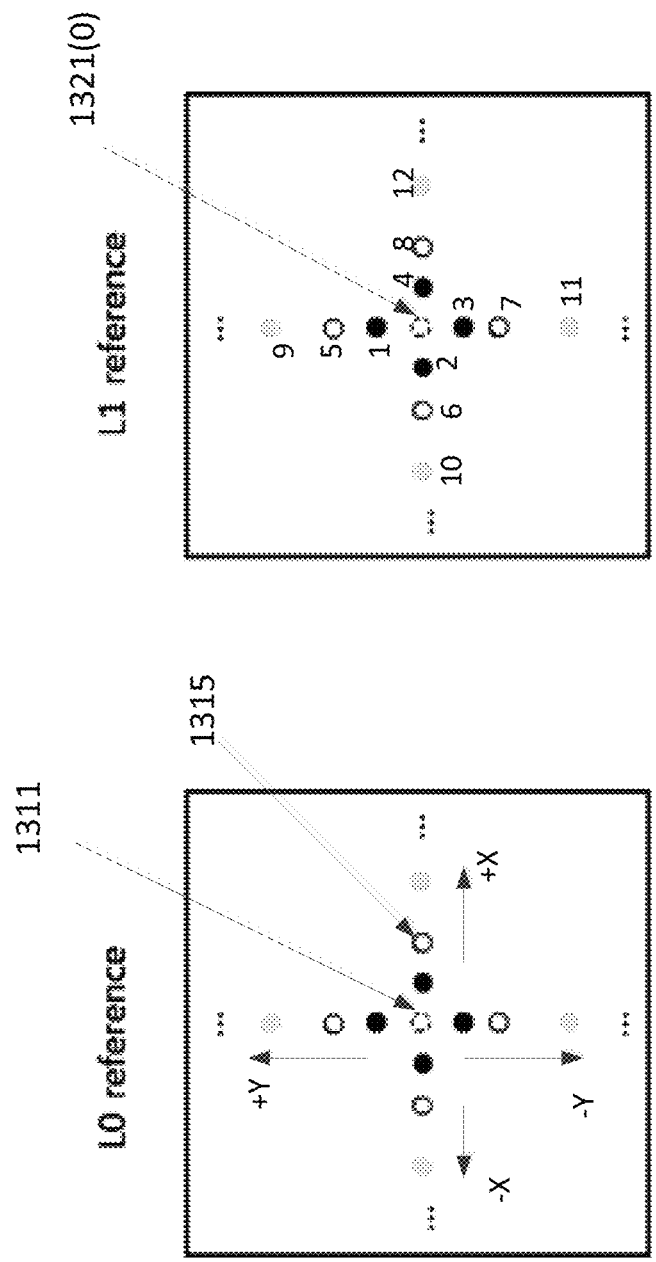
FIG. 13 shows examples for MMVD according to an embodiment of the disclosure.

FIG. 13 shows examples for MMVD according to an embodiment of the disclosure. For example, the starting point MV is shown by (1311) (for example according to the prediction direction IDX and base candidate IDX). In the FIG. 13 example, 4 search directions, such as +Y, −Y, +X and −X, are used, and the four search directions can be indexed by 0, 1, 2, 3. The distance can be indexed by 0 (0 distance to the starting point MV), 1 (1 s to the starting point MV), 2 (2s to the starting point MV), 3 (3s to the starting point), and the like. Thus, when the search direction IDX is 3, and the distance IDX is 2, the final MV predictor is shown as (1315).

In another example, the search direction and the distance can be combined for indexing. For example, the starting point MV is shown by (1321) (for example according to the prediction direction IDX and base candidate IDX). The search direction and the distance are combined to be indexed by 0-12 as shown in FIG. 13.

According to an aspect of the disclosure, techniques that allow blocks to share a merge candidate list can be used when the block size and/or sub-blocks sizes meet certain conditions. When blocks share the same merge candidate list, the blocks can be reconstructed using parallel processing in some examples to improve decoding efficiency.

In some examples, a CTU is recursively partitioned into one or more CUs, and the recursive partition results can be represented by a CU split tree (or coding tree). For example, a CTU can be a single CU or can be split into four smaller units, which are nodes of the CU split tree. When a unit is a leaf node (no further splitting) of the CU split tree, the unit becomes a CU (also named as a leaf CU). Otherwise, the unit can be split again into four smaller units when the split size is equal or larger than the minimum CU size specified in the SPS. The unit is referred to as parent node, and the smaller units are referred to as child nodes. In some examples, when a node in the CU split tree is recursively split into multiple leaf CUs, the node is referred to as an ancestor node for the multiple leaf CUs.

In some embodiments, all the leaf CUs of an ancestor node in the CU split tree share a same merge candidate list for enabling parallel processing of small skip/merge-coded CUs. The ancestor node is named merge sharing node (MSN). The shared merge candidate list is generated at the merge sharing node pretending the merge sharing node is a leaf CU. For example, the spatial candidates in the shared merge candidate list are selected from spatial neighbors of the MSN. Further, the temporal candidates and a history-based candidate buffer are also associated with the MSN.

According to an aspect of the disclosure, the MSN has separate inter prediction merge candidate list and intra block copy (IBC) merge candidate list. The inter prediction merge candidate list includes inter prediction candidates, and the IBC merge candidate list includes IBC candidates. Further, the MSN has separate buffers for storing history-based inter prediction candidates and storing history-based IBC candidates. The buffer for storing the history-based inter prediction candidates is referred to as HMVP buffer, and the buffer for storing history-based IBC candidates is referred to as HBVP buffer.

Figure 14:
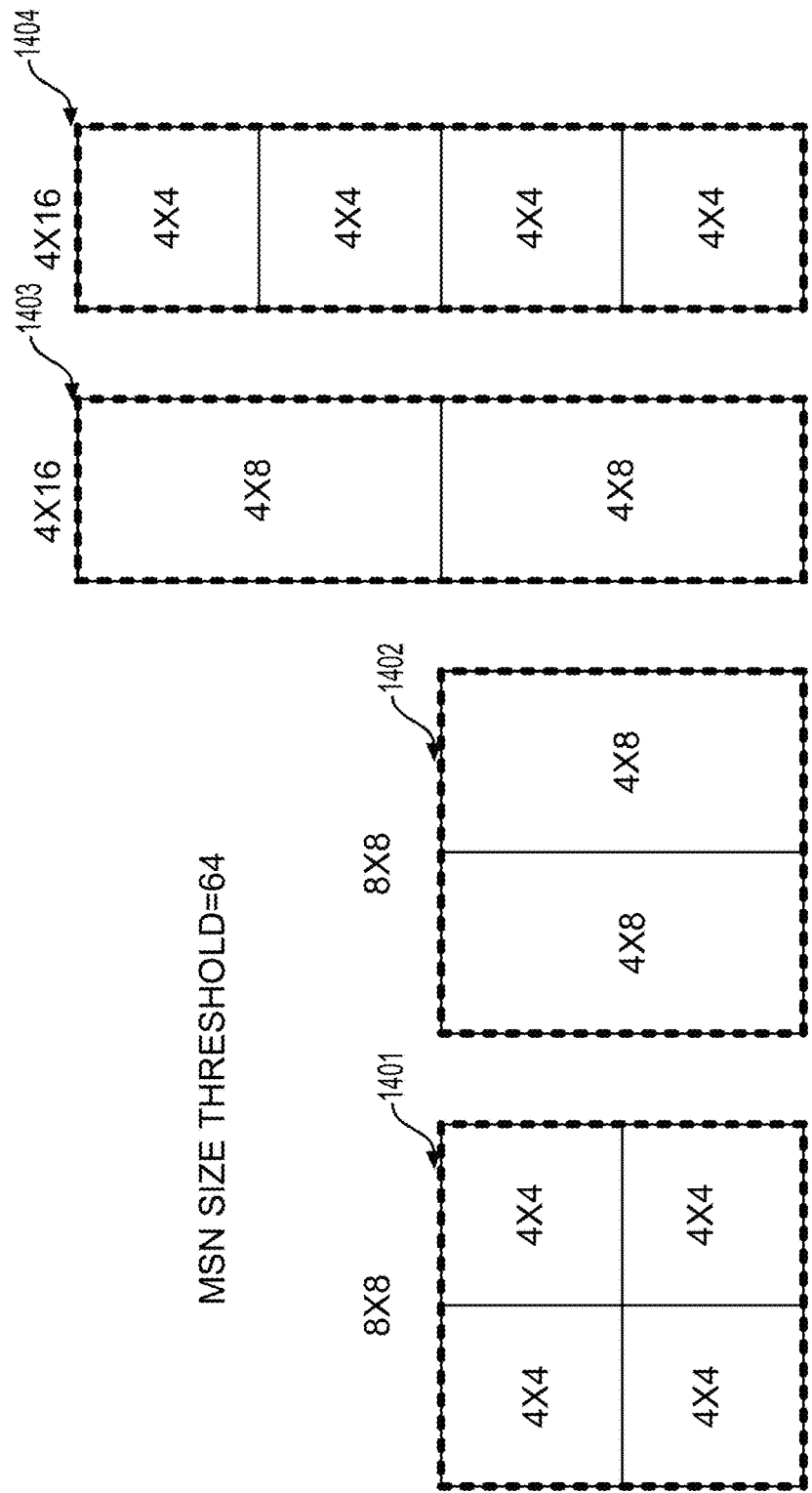
FIG. 14 shows four examples (A)-(D) of merge sharing nodes (1401)-(1404).

FIG. 14 shows four examples (A)-(D) of merge sharing nodes (1401)-(1404). In each of the four examples (A)-(D), a shared merge candidate list is generated for a virtual CU (i.e., merge sharing node) as shown by a dotted block.

In some examples, the merge sharing node will be decided for each CU inside a CTU during parsing stage of decoding; moreover, the merge sharing node is an ancestor node of leaf CUs when two criteria are satisfied. The first criterion requires that the size of the merge sharing node is equal to or larger than a size threshold. The second criterion requires that, in the merge sharing node, one of the child CU size is smaller than the size threshold. The size threshold can be any suitable value, such as 32, 64, and the like.

It is noted that, in some examples, the merge sharing node is required not having samples outside the picture boundary. During the parsing stage, when an ancestor node satisfies the first criterion and the second criterion criteria, but has some samples outside the picture boundary, then the ancestor node cannot be the merge sharing node.

Figure 15:
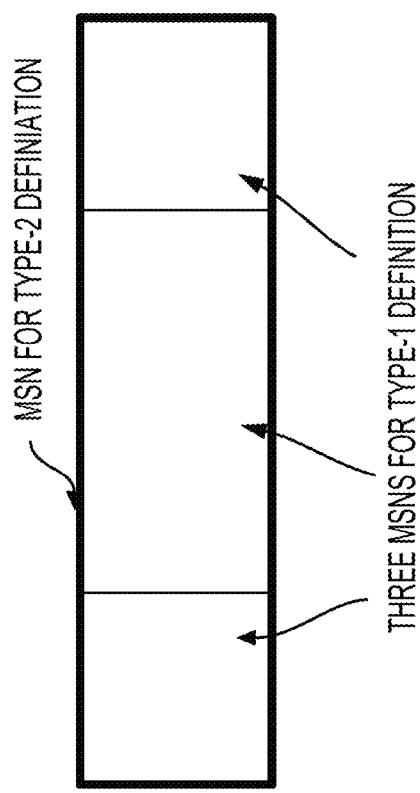
FIG. 15 shows an example for the difference of Type-1 and Type-2 definition for merge sharing node.

FIG. 15 shows an example for the difference of Type-1 and Type-2 definition for merge sharing node. In the FIG. 15 example, a parent node (with thicker border lines) is ternary-split into 3 child nodes (with thinner border lines). The size of the parent node is 128. For Type-1 definition, the 3 child-nodes will be merge sharing nodes separately. For the Type-2 definition, the parent node is the merge sharing node.

In some embodiments, the shared merge candidate list algorithm supports translational merge (e.g., including merge mode and triangle merge mode). Further, the shared merge candidate list algorithm supports history-based candidates and subblock-based merge mode. For all kinds of merge mode, the shared merge candidate list algorithm operates in the same manner, and generates candidates at the merge sharing node pretending that the merge sharing node is a leaf CU.

Aspects of the disclosure provide techniques for parallel processing using a shared merge candidate list for all blocks in a defined area when IBC block vector prediction is used.

According to an aspect of the disclosure, constraints on HBVP buffer update process are used when current block is inside a region designed for parallel processing purpose. The following description is related to a region with a shared merge candidate list. Also, the merge candidate list of IBC mode is assumed to be separate from the merge candidate list of the inter picture prediction mode. However, the scope of disclosure is not limited to the shared merge candidate list or separate IBC/inter merge candidate lists.

According to an aspect of the disclosure, when a current block is in a merge sharing node (MSN) with merge candidate lists (e.g., inter prediction merge candidate list, IBC merge candidate list) shared by blocks in the MSN, the IBC merge candidate list of the ancestor node is shared with all blocks coded in IBC mode. In other words, the shared merge candidate list concept applies to both blocks coded in the IBC mode and blocks coded in the inter picture prediction mode using the same block size criteria. In an example, an ancestor node is determined to be a merge sharing node for leaf CUs in the ancestor node. The ancestor node is considered as a virtual CU, and an IBC merge candidate list is constructed for the MSN. Then, when the current block in the MSN is coded in the IBC mode, the current block is then reconstructed based on the IBC merge candidate list associated with the MSN. Thus, no separate merge candidate list construction is needed for the current block in an example.

According to another aspect of the disclosure, when a current block is IBC coded and in a merge sharing node (MSN) with an IBC merge candidate list that is shared by all blocks coded in the IBC mode and within the same MSN, the HBVP buffer associated with the MSN is also shared by all the blocks coded in the IBC mode and within the same MSN, thus restrictions are applied to updates of the HBVP buffer that is associated with the MSN.

In an embodiment, HBVP buffer is not updated based on the BV information from the current block. When the BV information for the current block is determined, no HBVP buffer update is performed.

In another embodiment, the HBVP buffer is only updated with the BV information from the current block, when the current block is IBC coded but not coded in merge/skip mode. In an example, the current block (IBC coded) is in AMVP mode with MVD (e.g., the BV difference is coded in the coded video bitstream), and when the BV information of the current block is determined, the HBVP buffer is updated with the BV information of the current block. When the current block (IBC coded) is coded in merge/skip mode, HBVP buffer is not updated with the BV information from the current block.

In another embodiment, HBVP buffer is only updated with the BV information from the current block when the current block is IBC coded (can be either merge/skip mode or AMVP mode) but not coded in merge/skip mode with the selected merge candidate from the shared merge candidate list for the MSN. In an example, when the current block is IBC coded in the merge/skip mode, and the selected merge candidate is from the IBC merge candidate list of the MSN that is shared by other blocks in the IBC mode, then the HBVP buffer is not updated with the BV information of the current block.

In another embodiment, HBVP buffer is only updated with the BV information from the current block when the current block is the first IBC coded block in the corresponding MSN. In an example, the current block is the first IBC coded block (not necessarily the first coded block) in the MSN, then the HBVP buffer is updated according to the BV information from the current block.

In another embodiment, HBVP buffer is only updated with the BV information from the current block when the current block is the first coded block in the corresponding MSN. In an example, the current block is the first coded block in the MSN, and when the current block is IBC coded, the HBVP buffer is updated according to the BV information of the current block.

In another embodiment, HBVP buffer is only updated when the current block is the last IBC coded block in the corresponding MSN. In an example, the current block is the last IBC coded block (not necessarily the last coded block) in the MSN, then when the BV information of the current block is determined, the HBVP buffer is updated according to the BV information of the current block.

In another embodiment, HBVP buffer is only updated when the current block is the last coded block in the corresponding MSN. In an example, the current block is the last coded block in the MSN, then when the current block is IBC coded, and the BV information of the current block is determined, the HBVP buffer is updated according to the BV information of the current block.

Figure 16:
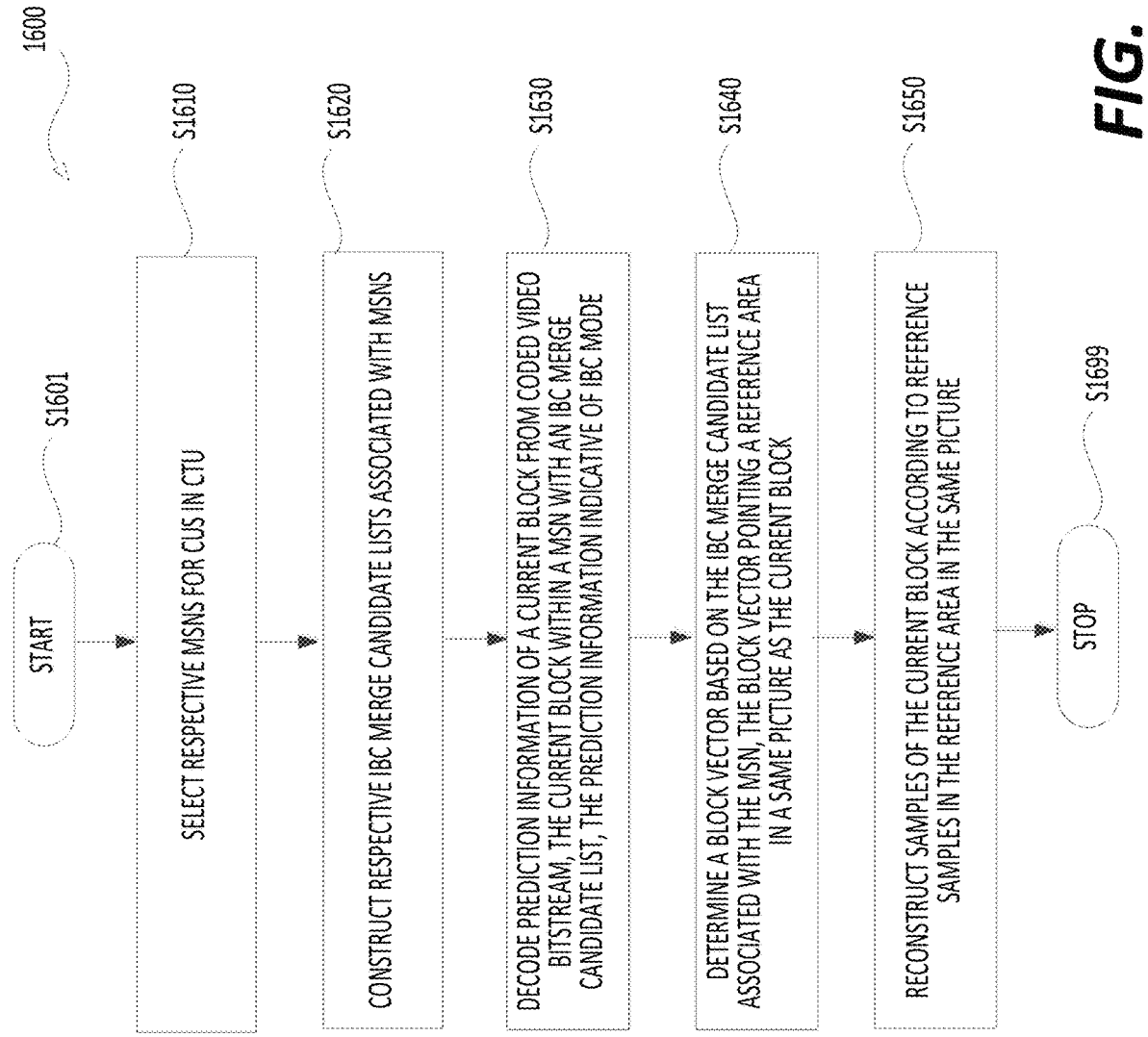
FIG. 16 shows a flow chart outlining a process example (1600) according to an embodiment of the disclosure.

FIG. 16 shows a flow chart outlining a process (1600) according to an embodiment of the disclosure. The process (1600) can be used in the reconstruction of a block coded in intra mode, so to generate a prediction block for the block under reconstruction. In various embodiments, the process (1600) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the intra prediction module (352), the processing circuitry that performs functions of the video encoder (403), the processing circuitry that performs functions of the predictor (435), the processing circuitry that performs functions of the intra encoder (522), the processing circuitry that performs functions of the intra decoder (672), and the like. In some embodiments, the process (1600) is implemented in software instructions, thus when the processing circuitry executes the software instructions, the processing circuitry performs the process (1600). The process starts at (S1601) and proceeds to (S1610).

At (S1610), merge sharing nodes (MSNs) are respectively selected for CUs in a CTU. In some examples, during a parsing stage of decoding, MSN is decided for each CU inside a CTU based on certain criteria. An ancestor node of multiple leaf CUs can be the MSN for the multiple leaf CUs when the ancestor node satisfies the criteria.

At (S1620), IBC merge candidate lists respectively associated with the MSNs are constructed pretending the MSNs are leaf CUs. In some examples, for each MSN, an inter prediction merge candidate list and an IBC merge candidate list are constructed assuming the MSN is a leaf CU. The inter prediction merge candidate list and the IBC merge candidate list are shared by leaf CUs in the MSN.

At (S1630), prediction information of a current block is decoded from the coded video bitstream. The current block is within a MSN with an IBC merge candidate list, and the prediction information is indicative of IBC mode.

At (S1640), a block vector for the current block is determined based on the IBC merge candidate list associated with the MSN. The block vector points to a reference area in a same picture as the current block.

At (S1650) samples of the current block are reconstructed according to reference samples in the reference area. Then, the process proceeds to (S1699), and terminates.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
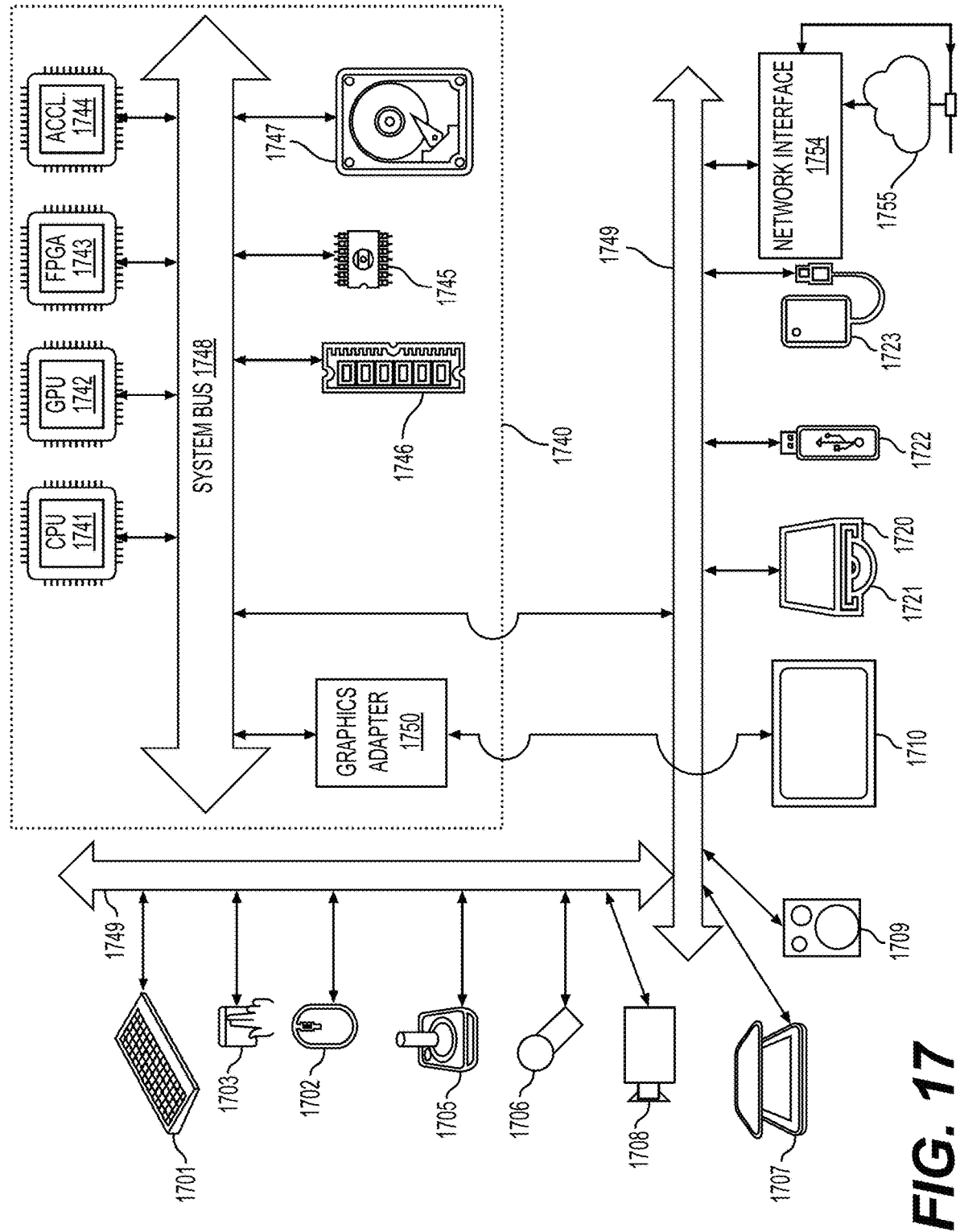
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding first prediction information of a first block from a coded video bitstream, the first block being within a merge sharing node (MSN) with an intra block copy (IBC) merge candidate list that is constructed based on the MSN and shared within the MSN, the first prediction information being indicative of an IBC mode;
    determining a first block vector that points to a first reference area in a same picture as the first block based on the IBC merge candidate list associated with the MSN;
    reconstructing at least a sample of the first block based on first reference samples of the first reference area in the same picture; and
    maintaining a history-based block vector prediction (HBVP) buffer associated with the MSN, the HBVP buffer being used for reconstruction of the blocks in the MSN and being coded in the IBC mode, and when the IBC merge candidate list is shared by all blocks coded in the IBC mode and within the same MSN, at least one of a plurality of predetermined conditions are applied to a HBVP buffer update process.

2. The method of claim 1, further comprising:
    decoding second prediction information of a second block from the coded video bitstream, the second block being within the MSN, the second prediction information being indicative of the intra block copy mode;

determining a second block vector that points to a second reference area in the same picture based on the IBC merge candidate list that is shared by the first block and the second block; and reconstructing at least a sample of the second block based on second reference samples of the second reference area in the same picture.

3. The method of claim 1, further comprising:

decoding second prediction information of a second block from the coded video bitstream, the second block being within the MSN with an inter prediction merge candidate list that is separate from the IBC merge candidate list and constructed based on the MSN, the second prediction information being indicative of an inter prediction mode;

determining a motion vector that points to a reference area in a reference picture based on the inter prediction merge candidate list; and reconstructing at least a sample of the second block based on reference samples of the reference area in the reference picture.

4. The method of claim 3, further comprising:

maintaining a history-based inter prediction (HBVP) buffer, associated with the MSN and separate from the HBVP buffer, the HBVP buffer being used for reconstruction of the blocks in the MSN and being coded in the inter prediction mode.

5. The method of claim 1, further comprising:

selecting an ancestor node of the first block in a coding tree to be the MSN when the ancestor node meets a size requirement; and constructing the IBC merge candidate list for the MSN based on spatial and temporal neighbors of the MSN, the IBC merge candidate list being used for reconstruction of blocks in the MSN and being coded in the IBC mode.

6. The method of claim 1, further comprising:

skipping an update of the HBVP buffer based on the first block vector as one of the predetermined conditions.

7. The method of claim 1, further comprising:

updating the HBVP buffer based on the first block vector when a difference of the first block vector to a candidate is coded in the coded video bitstream as one of the predetermined conditions.

8. The method of claim 1, further comprising:

updating the HBVP buffer based on the first block vector when the first block vector is not selected from the IBC merge candidate list as one of the predetermined conditions.

9. The method of claim 1, further comprising:

updating the HBVP buffer based on the first block vector when the first block is the last coded block in the MSN as one of the predetermined conditions.

10. The method of claim 1, further comprising:

updating the HBVP buffer based on the first block vector when first block is the last IBC coded block in the MSN as one of the predetermined conditions.

11. An apparatus for video decoding, comprising:

processing circuitry configured to:

decode first prediction information of a first block from a coded video bitstream, the first block being within a merge sharing node (MSN) with an intra block copy (IBC) merge candidate list that is constructed based on the MSN and shared within the MSN, the first prediction information being indicative of an IBC mode;

determine a first block vector that points to a first reference area in a same picture as the first block based on the IBC merge candidate list associated with the MSN;

reconstruct at least a sample of the first block based on first reference samples of the first reference area in the same picture; and maintain a history-based block vector prediction (HBVP) buffer associated with the MSN, the HBVP buffer being used for reconstruction of the blocks in the MSN and being coded in the IBC mode, and when the IBC merge candidate list is shared by all blocks coded in the IBC mode and within the same MSN, at least one of a plurality of predetermined conditions are applied to a HBVP buffer update process.

12. The apparatus of claim 11, wherein the processing circuitry is further configured to:

decode second prediction information of a second block from the coded video bitstream, the second block being within the MSN, the second prediction information being indicative of the intra block copy mode;

determine a second block vector that points to a second reference area in the same picture based on the IBC merge candidate list that is shared by the first block and the second block; and reconstruct at least a sample of the second block based on second reference samples of the second reference area in the same picture.

13. The apparatus of claim 11, wherein the processing circuitry is further configured to:

decode second prediction information of a second block from the coded video bitstream, the second block being within the MSN with an inter prediction merge candidate list that is separate from the IBC merge candidate list and constructed based on the MSN, the second prediction information being indicative of an inter prediction mode;

determine a motion vector that points to a reference area in a reference picture based on the inter prediction merge candidate list; and reconstruct at least a sample of the second block based on reference samples of the reference area in the reference picture.

14. The apparatus of claim 11, wherein the processing circuitry is further configured to:

select an ancestor node of the first block in a coding tree to be the MSN when the ancestor node meets a size requirement; and construct the IBC merge candidate list for the MSN based on spatial and temporal neighbors of the MSN, the TBC merge candidate list being used for reconstruction of blocks in the MSN and being coded in the IBC mode.

15. The apparatus of claim 11, wherein the processing circuitry is further configured to:

skip an update of the HBVP buffer based on the first block vector as one of the predetermined conditions.

16. The apparatus of claim 11, wherein the processing circuitry is further configured to:

update the HBVP buffer based on the first block vector when a difference of the first block vector to a candidate is coded in the coded video bitstream as one of the predetermined conditions.

17. The apparatus of claim 11, wherein the processing circuitry is further configured to:

update the HBVP buffer based on the first block vector when the first block vector is not selected from the IBC merge candidate list as one of the predetermined conditions.

18. The apparatus of claim 11, wherein the processing circuitry is further configured to:

update the HBVP buffer based on the first block vector when the first block is at least one of the last coded block in the MSN and the last TBC coded block in the MSN as one of the predetermined conditions.

19. A non-transitory computer-readable medium storing instructions which when executed by a computer for video decoding cause the computer to perform:

decoding first prediction information of a first block from a coded video bitstream, the first block being within a merge sharing node (MSN) with an intra block copy (IBC) merge candidate list that is constructed based on the MSN and shared within the MSN, the first prediction information being indicative of an IBC mode;

determining a first block vector that points to a first reference area in a same picture as the first block based on the IBC merge candidate list associated with the MSN;

reconstructing at least a sample of the first block based on first reference samples of the first reference area in the same picture; and maintaining a history-based block vector prediction (HBVP) buffer associated with the MSN, the HBVP buffer being used for reconstruction of the blocks in the MSN and being coded in the IBC mode, and when the IBC merge candidate list is shared by all blocks coded in the IBC mode and within the same MSN, at least one of a plurality of predetermined conditions are applied to a HBVP buffer update process.

20. The apparatus of claim 13, wherein the processing circuitry is further configured to:

maintain a history-based inter prediction (HBVP) buffer, associated with the MSN and separate from the HBVP buffer, the HBVP buffer being used for reconstruction of the blocks in the MSN and being coded in the inter prediction mode.

* * * * *